US011625050B2

(12) United States Patent
Kawano

(10) Patent No.: US 11,625,050 B2
(45) Date of Patent: Apr. 11, 2023

(54) MOVING ROBOT, MOVING ROBOT CONTROL METHOD AND PROGRAM THEREFOR

(71) Applicant: NIPPON TELEGRAPH AND TELEPHONE CORPORATION, Tokyo (JP)

(72) Inventor: Hiroshi Kawano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 234 days.

(21) Appl. No.: 17/269,631

(22) PCT Filed: Aug. 8, 2019

(86) PCT No.: PCT/JP2019/031289
§ 371 (c)(1),
(2) Date: Feb. 19, 2021

(87) PCT Pub. No.: WO2020/039951
PCT Pub. Date: Feb. 27, 2020

(65) Prior Publication Data
US 2021/0341945 A1    Nov. 4, 2021

(30) Foreign Application Priority Data
Aug. 24, 2018   (JP) .............................. JP2018-157544

(51) Int. Cl.
*G05D 1/00*    (2006.01)
*G05D 1/02*    (2020.01)

(52) U.S. Cl.
CPC ......... *G05D 1/0295* (2013.01); *G05D 1/0272* (2013.01); *G05D 1/0293* (2013.01)

(58) Field of Classification Search
CPC combination set(s) only.
See application file for complete search history.

(56) References Cited

PUBLICATIONS

Vassilvitskii et al. (2002) "A Complete, Local and Parallel Reconfiguration Algorithm for Cube Style Modular Robots," 2002 IEEE Int. Conf. Robotics and Automation, May 2002, pp. 117-122.
(Continued)

*Primary Examiner* — Vivek D Koppikar
*Assistant Examiner* — Jeffrey R Chalhoub

(57) ABSTRACT

Provided is a control technique for achieving formation control which is applicable even when there is a non-connection location in a common portion between a set of initial positions of robot units and a set of target positions of the robot units. Each of a plurality of robots constituting a mobile robot includes a position distance calculation command transmission unit 1, a position distance calculation command transfer unit 2, a return position distance calculation command transmission unit 3, a direction storage unit 4, a return position distance calculation command transfer unit 5, a first head robot determination command transmission unit 6, a void generation order determination unit 7, a void generation command transfer unit 8, a push command transmission unit 9, a return push command transmission unit 10, a return push command transfer unit 11, a void operation command transmission unit 12, a first movement unit 13, a void operation command transfer unit 14, a movement command transmission unit 15, a return movement command transmission unit 16, a second movement unit 17, a pull command transmission unit 18, a return pull command transmission unit 19, a third movement unit 20, a control unit 21, a set updating unit 22, and a second head robot determination command transmission unit 23.

3 Claims, 8 Drawing Sheets

(56) References Cited

PUBLICATIONS

Hiroshi Kawano (2017) "Tunneling-Based Self-Reconfiguration of Heterogeneous Sliding Cube-Shaped Modular Robots in Environments with Obstacles," 2017 IEEE International Conference on Robotics and Automation, May 2017, pp. 825-832.

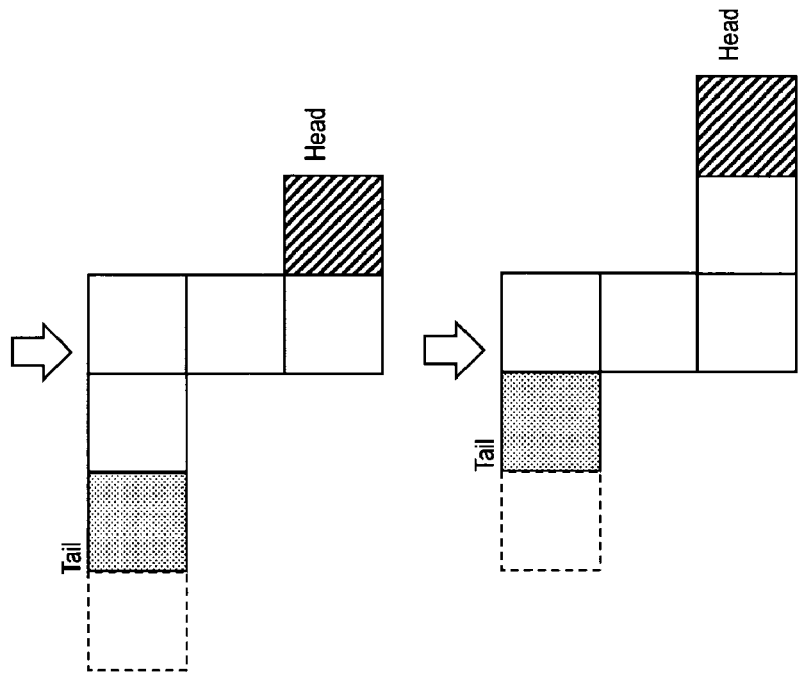
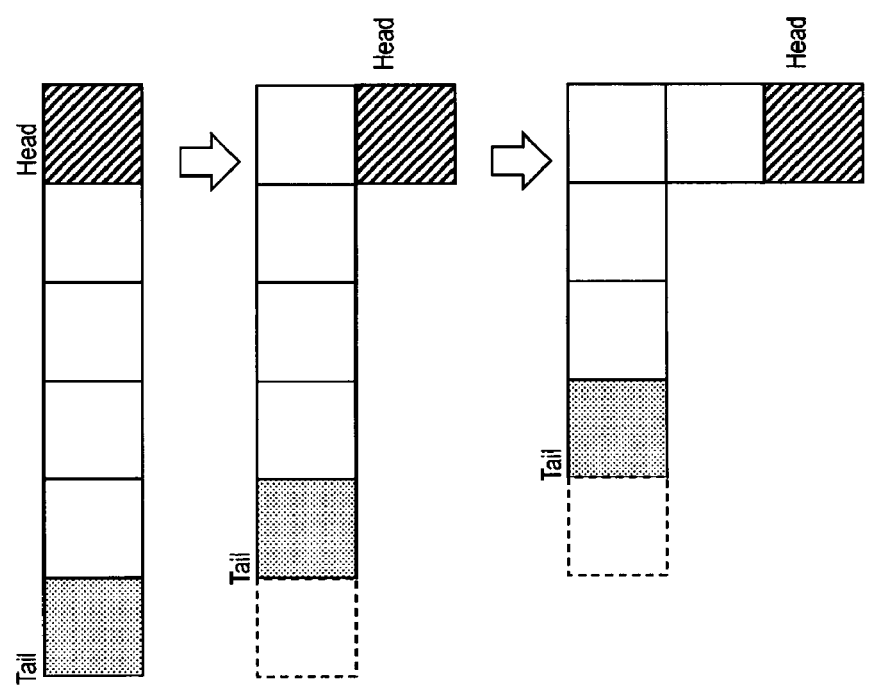
Fig. 4

MOVING ROBOT, MOVING ROBOT CONTROL METHOD AND PROGRAM THEREFOR

CROSS-REFERENCE TO RELATED APPLICATIONS

This application is a U.S. 371 Application of International Patent Application No. PCT/JP2019/031289, filed on 8 Aug. 2019, which application claims priority to and the benefit of JP Application No. 2018-157544, filed on 24 Aug. 2018, the disclosures of which are hereby incorporated herein by reference in their entireties.

TECHNICAL FIELD

The present disclosure relates to a technique for controlling actions of a plurality of robots. The present disclosure relates to, for example, a robot cooperation control technique for obtaining an action plan for cooperatively moving a plurality of robots from a formation state at an initial position, making the robots avoid obstacles, and for causing the robots to reach target positions in a certain formation state.

BACKGROUND ART

In recent years, studies for efficiently controlling a large number of autonomous mobile robots have been actively conducted. With regard to various tasks including monitoring of locations where entry of persons is prohibited and conveyance of goods, there is a need for techniques for efficient formation of a large number of robots through cooperative operations, and research thereon is actively conducted.

In particular, in formation control of robots, in robot formation control under the assumption that robots move collectively like amoebas in a state where the robots are in contact with each other, there are an advantage that absolute positions of the robots can be determined from a relative positional relationship between the robots and an advantage that additional equipment for position measurement is not required, and studies on such robots have also been conducted. For example, in a series of studies leading to a study disclosed in Non Patent Literature 2, formation control for making a change from a certain formation to another formation is disclosed (see, for example, Non Patent Literature 2).

In order to achieve such efficient formation with a large number of robots, it is important to preliminarily plan the disposition, the order of operations, and the like of the robots. In such a plan, naturally, the presence of obstacles, the shapes of routes, and the like in the actual environment in which the plurality of robots operate have to be sufficiently considered.

A method shown in a study disclosed in Non Patent Literature 1 deals with formation deformation of a plurality of cuboid robots with an extension and contraction surface operation between the robots (an operation of a certain robot moving while being extended and contracted in a state of being in contact with another robot).

The method shown in the study disclosed in Non Patent Literature 2 deals with formation deformation of a plurality of cuboid robots due to a surface shearing operation between the robots (an operation of a certain robot sliding on a contact surface in a state of being in contact with another robot).

CITATION LIST

Non Patent Literature

Non Patent Literature 1: S. Vassilvitskii, M. Yim, J. Suh, "A Complete, Local and Parallel Reconfiguration Algorithm for Cube Style Modular Robots", in Proc. 2002 IEEE Int. Conf. Robotics and Automation, pp. 117-122, Washington D.C., May, 2002.

Non Patent Literature 2: Kawano, H., "Tunneling-Based Self-Reconfiguration of Heterogeneous Sliding Cube-Shaped Modular Robots in Environments with Obstacles", 2017 IEEE International Conference on Robotics and Automation, pp. 825-832, May 2017, Singapore.

SUMMARY OF THE INVENTION

Technical Problem

In Non Patent Literature 2, an operation in a state where robots are in contact with each other is assumed, and the robots have different characteristics (heterogeneous). That is, formation control in a case where the shape of a set of target positions of the robots is determined is achieved. However, the present disclosure is limited to application only under conditions in which there are no non-connection locations in a common portion between a set of formation positions taken by the robots in an initial state and a set of target positions of the robots.

Therefore, an object of the present disclosure is to provide a mobile robot which can move even when there is a non-connection location in a common portion between an initial position of a robot unit and a target position of a robot unit, a mobile robot control method, and a program.

Means for Solving the Problem

A mobile robot according to an aspect of the present disclosure is a mobile robot that moves from a predetermined initial position to a predetermined target position, the mobile robot consisting of a plurality of robot units, each of the robot units including a plurality of robots, a robot structure of one block consisting of each of the robot units adjacent to another robot unit referred to as connectivity of the robot structure, a common portion between the initial position and the target position set to be a common position, and the common position consisting of a set of one or more partial common positions, and each of the plurality of robots including a position distance calculation command transmission unit which transmits, in a case where the robot is a robot i_root located at a predetermined root position, a position distance calculation command including a relative position from the predetermined root position and the number of times of transmission and transfer of a position distance calculation command, which are respectively set to predetermined initial values, to an adjacent robot, a position distance calculation command transfer unit which increments, in a case where the position distance calculation command is received, the number of times of transmission and transfer included in the position distance calculation command, updates a relative position included in the position distance calculation command in accordance with a direction in which the position distance calculation command is received, and transfers a position distance calculation command including the incremented number of times of transmission and transfer and the updated relative position to an adjacent robot, other than the robot transmitting the position distance calculation command, only once, a return position distance calculation command transmission unit which transmits, in a case where the position distance calculation command is initially received, a return position distance calculation command including the incremented number of times of transmission and transfer and the updated relative position to the robot transmitting the position distance calculation command, a direction storage unit which stores, in a case where the position distance calculation command is initially received, a direction of the robot transmitting the position distance calculation command as a root direction, a return position distance calculation command transfer unit which transfers, in a case where the return position distance calculation command is received, the received return position distance calculation command in the root direction read from the direction storage unit, a first head robot determination command transmission unit which selects, in a case where the robot is the robot i_root and the return position distance calculation commands transmitted by all of the robots have been received, any one partial common position set as a set Up based on the positions of the robots based on the initial position, the target position, and the relative position included in the return position distance calculation command, selects a robot unit, as a head robot unit Head, which is located at a position belonging to the set Up and adjacent to a position where there is no robot unit within the target position (hereinafter, referred to as an objective position D), and transmits a head robot determination command including the positions of the robots and information on the set Up to a predetermined robot h included in the selected head robot unit Head, a void generation order determination unit which determines, in a case where the robot is the robot h and the head robot determination command is received, the objective position D, a tail robot unit Tail which is a robot unit located at a position not belonging to the set Up and positioned within the initial position and which is a robot unit capable of maintaining connectivity of the robot structure even when moved, a path from the head robot unit Head to the tail robot unit Tail, and a void generation order for the robots within the head robot unit Head, based on the positions of the robots and the information on the set Up, a void generation command transmission unit which transmits, in a case where the robot is the robot h, a void generation command addressed to a robot v1 at a position based on the determined void generation order within the head robot unit Head to an adjacent robot unit, a void generation command transfer unit which transfers, in a case where the void generation command is received, the void generation command to an adjacent robot until the void generation command reaches the robot v1, a push command transmission unit which transmits, in a case where the robot is the robot v1 and the void generation command is received, a push command to an adjacent robot in an ah direction with a direction in which the head robot unit Head moves as the ah direction, a return push command transmission unit which transfers, in a case where the push command is received and there is an adjacent robot in the ah direction, the push command to the adjacent robot in the ah direction, and transmits, in a case where the return push command is received and there is no robot adjacent thereto, a return push command to an adjacent robot in a direction opposite to the ah direction, a return push command transfer unit which transfers, the return push command to an adjacent robot in the direction opposite to the ah direction until the return push command reaches the robot v1, a void operation command transmission unit which transmits, in a case where the robot is the robot v1 and the return push command is received, a void operation command to a robot located on the path and adjacent to the robot v1, a first movement unit which moves, in a case where the robot is the robot v1 and the return push command is received and after the void operation command is transmitted, the robot v1 in the ah direction, a void operation command transfer unit which transfers, in a case where the void operation command is received, the void operation command to a robot located on the path and located in a direction approaching the tail robot unit Tail by one box from the robot itself within the path, a movement command transmission unit which transmits, in a case where the void operation command is received and the number of times of transmission and transfer of the void operation command is a predetermined number of times, a movement command to a robot transmitting the void operation command, a return movement command transmission unit which transmits, in a case where the movement command is received, a return movement command to a robot transmitting the movement command, a second movement unit which moves, in a case where the return movement command is received, the robot in a direction of a robot transmitting the void operation command together with the robot transmitting the void operation command, a pull command transmission unit which transmits, in a case where the robot is a robot which is included in a robot unit T' one robot unit before the tail robot unit Tail and located at a position within T' being the same as a position within a robot unit of the robot v1 with a moving direction of the head robot unit Tail as an at direction and in a case where the void operation command is received, a pull command to an adjacent robot in a direction opposite to the at direction, a return pull command transmission unit which transfers, in a case where the pull command is received and there is an adjacent robot in the direction opposite to the at direction within the tail robot unit Tail, the pull command to the adjacent robot in the direction opposite to the at direction, and transmits, in a case where the pull command is received and there is no robot adjacent thereto in the direction opposite to the at direction within the tail robot unit Tail, a return pull command to the adjacent robot in the direction opposite to the at direction, a third movement unit which moves, in a case where the return pull command is received, the robot in the at direction together with the robot transmitting the return pull command, a control unit which performs, in a case where the robot is the robot h, control so as to repeat processing of each of the void generation order determination unit, the void generation command transfer unit, the push command transmission unit, the return push command transmission unit, the return push command transfer unit, the void operation command transmission unit, the first movement unit, the void operation command transfer unit, the movement command transmission unit, the return movement command transmission unit, the second movement unit, the pull command transmission unit, the return pull command transmission unit, and the third movement unit until all of the robots included in the head robot unit Head are moved to the objective position D, a set updating unit which updates the set Up by adding the objective position D to the set Up in a case where the robot is the robot h and then, in a case where there is a robot unit which is in contact with the set Up and positioned within the target position instead of within the set Up, adding the position of the robot unit and a position of a robot unit in a connected state through only the position of the target position from the robot unit to the set Up; and a second head robot determination command transmission unit which updates, in a case where the robot is the robot h, the position of the tail robot unit Tail and positions of robots located at the objective position D, newly selects, in a case where there is a robot unit located at a position belonging to the set Up and adjacent to a position where there is no robot unit within the target position, the robot unit as a head robot unit Head based on the updated positions of the robots, and transmits a head robot determination command including the updated positions of the robots and information on the updated set Up to a predetermined robot h included in the newly selected head robot unit Head.

Effects of the Invention

According to the present disclosure, a mobile robot can move even when there is a non-connection location in a common portion between an initial position of a robot unit and a target position of a robot unit.

BRIEF DESCRIPTION OF DRAWINGS

FIG. 4 is a diagram illustrating tunneling.

DESCRIPTION OF EMBODIMENTS

Figure 1:
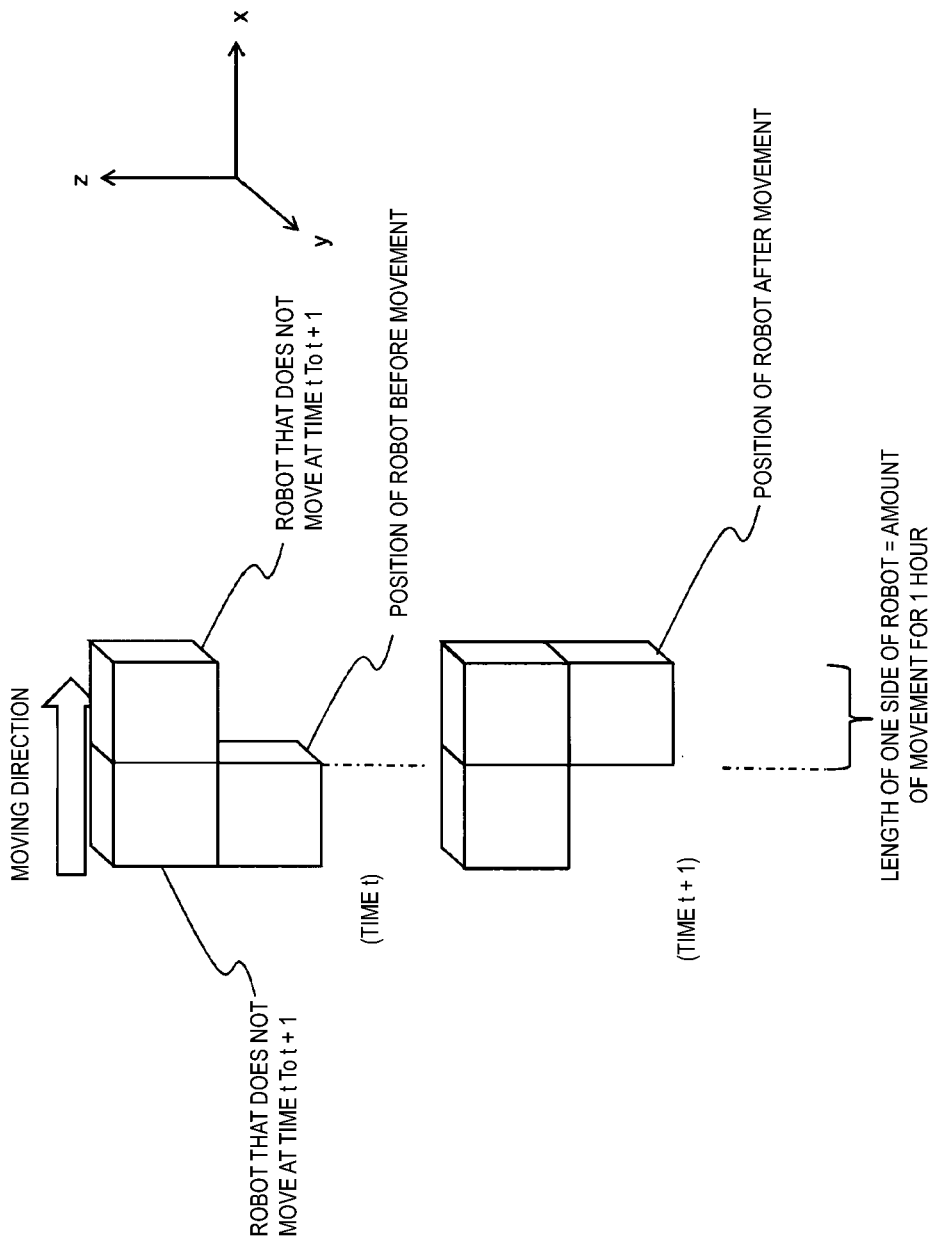
FIG. 1 is a diagram illustrating the movement of a robot.

Hereinafter, an embodiment according to the present disclosure will be described. Note that, in the drawings used for the following description, components having the same function and steps of performing the same processing will be denoted by the same reference numerals and signs, and repeated description thereof will be omitted.

Theoretical Background

First, the theoretical background of a mobile robot and a mobile robot control method will be described.

Problem Setting

Figure 2:
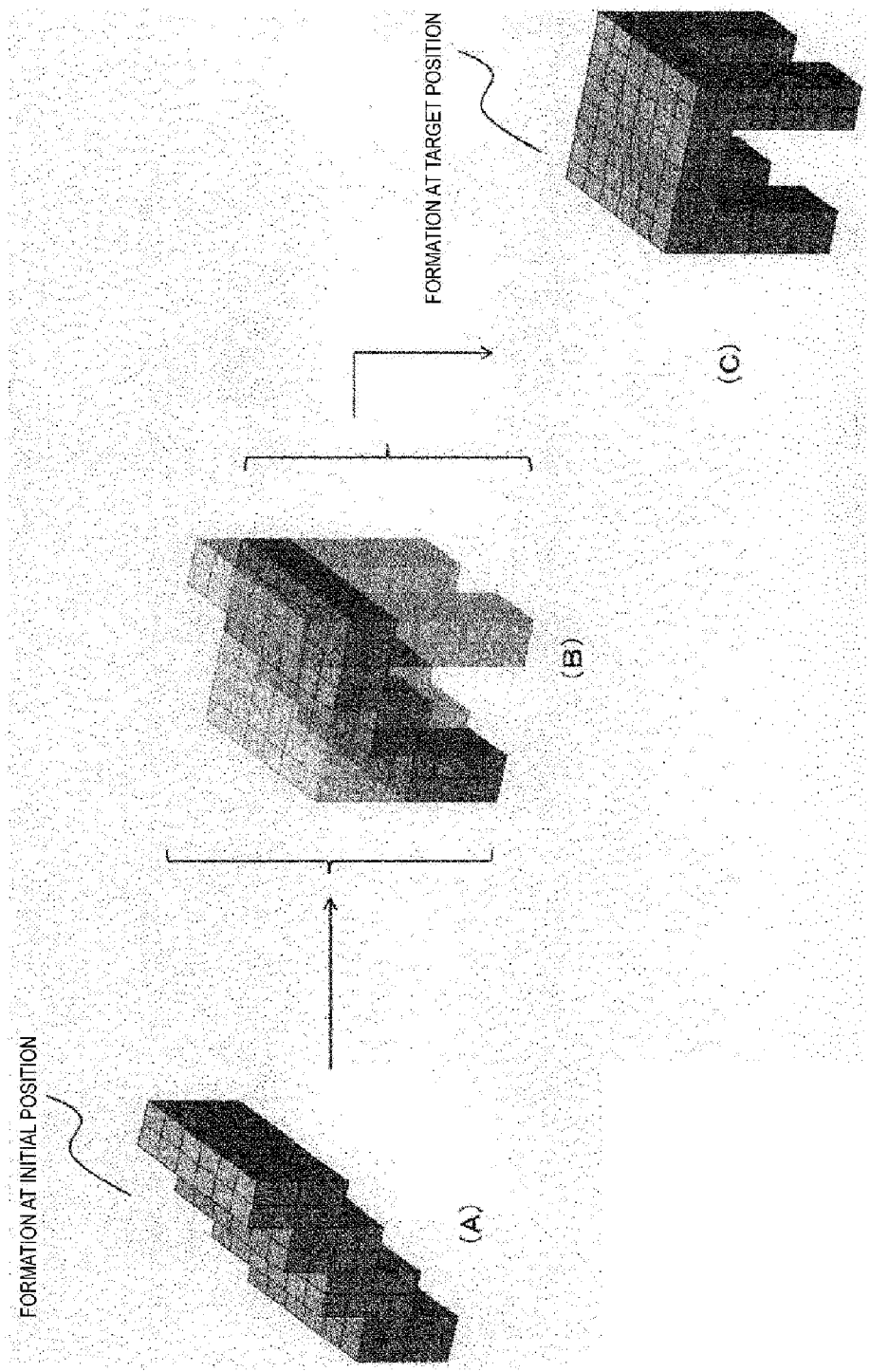
FIG. 2 is a diagram illustrating an initial position and a target position of a robot unit.

A task where a large number of robots cooperatively move while maintaining a mutual contact state from a formation state at an initial position and perform formation at a target position assumes the use of cuboid robots which can move by sliding against their surfaces which are in contact with each other, for example, as illustrated in FIG. 1. As illustrated in FIG. 2, the task is achieved by the movement of a plurality of robots from an initial position to a target position in a room partitioned off by walls (however, the walls is omitted in the drawing).

Regarding robots, for example, as illustrated in FIG. 1, it is assumed that the robots move while maintaining a state where another robot is present in one of six boxes in horizontal, vertical and height directions around the robots (hereinafter, also referred to as "up-down, right-left, and front-back directions"). This method has an advantage that in this case it is possible to accurately measure the amount of movement in a single operation of one robot itself moving a distance corresponding to the size of a single robot. In addition, it is also possible to easily ascertain the positions of robots in the entire group of robots by measuring relative positions of adjacent robots that share one surface. For this reason, it is difficult for a problem that a formation collapses due to an error in the amount of movement of the robots to be caused. In addition, it is possible to simultaneously move a plurality of robots by connecting a plurality of robots. Note that it is assumed that a robot can ascertain whether or not there is another robot at an adjacent position, whether or not there are obstacles, and whether or not the robot is on a target position.

There are p robots that perform a task (for example, $p \geq 16 = 8 \times 2$), and the robots can move in X-Y-Z axis directions in a three-dimensional space while sharing one or more surfaces with adjacent robots. Each of the cubes illustrated in FIG. 1 represents the position of one of the robots. There can be only one robot in each cube. It is assumed that each of the robots is stopped in a case where there is an obstacle or another robot in a direction in which the robot attempts to move. Note that a cuboid space in which a robot may be present is referred to as a box or a grid. In FIG. 2, a dark gray box indicates a position at which a robot is present. A position at which a robot is present in FIG. 2(A) indicates a set of initial positions of robots, and a position at which a robot is present in FIG. 2(C) indicates a set of target positions of the robots. As illustrated in FIG. 2(B), a set of target positions and a set of initial positions are in contact with each other. A region represented by the set of target positions is also referred to as a target formation area. In this manner, the initial positions and the target positions are adjacent to other initial positions and target positions in at least one direction in the horizontal, vertical and height directions, and formation of the robots at the initial positions and the target positions has any shape of one block.

Setting of Coordinates of Robot

When the position of each of robots i ($i=0, 1, 2, 3, \ldots, p-1$, which represents a robot number) is set to be ($Xr[i]$, $Yr[i]$, $Zr[i]$), an initial position is set to be ($Xr0[i]$, $Yr0[i]$, $Zr0[i]$), and a target position is set to be ($Xre[i]$, $Yre[i]$, $Zre[i]$), the present problem can be defined as obtaining an action plan for a robot disposed at an initial position to move to a target position. A set of the initial positions of robots is set to be s, and a set of the target positions ($Xre[i]$, $Yre[i]$, $Zre[i]$) is set to be g.

Definition of Task Space

When i is set to be a robot number, states of a robot i (the position and an action of the robot) are expressed as discrete values. When a room is represented by a three-dimensional space constituted by an X, Y, and Z orthogonal coordinate system, each position is expressed by values obtained by respectively performing discretization expression on an X-axis, a Y-axis, and a Z-axis. That is, the room (three-dimensional space) is partitioned by a grid, and each grid corresponds to one location. Further, "present/absent" with respect to obstacles is set for each grid in advance.

Definition of Robot Operation

The main body of an action is each robot disposed in a room. An action a of a robot i (i is a robot number) takes any one of a total of seven types of actions including stopping and movements in the horizontal, vertical, and height directions by one grid.

For example, as $a \in \{0,1,2,3,4,5,6\}$:
0: Stopped
1: Movement by one grid in a positive X-direction in a three-dimensional space
2: movement by one grid in a positive Y-direction in a three-dimensional space 3: movement by one grid in a negative X-direction in a three-dimensional space
4: movement by one grid in a negative Y-direction in a three-dimensional space
5: movement by one grid in a positive Z-direction in a three-dimensional space
6: movement by one grid in a negative Z-direction in a three-dimensional space Problem in Searching Calculation A state space in such a task environment has a state of the number of dimensions of the number of robots×3, and there are the number of actions that can be selected by a robot number power of actions (=7 types) of the robots. For example, when the number of robots is 50 and the number of grids in each of the horizontal, vertical, and height directions of a room is set to be 20, the number of states is 20 to the power of 150, and the amount of resources required for searching calculation is enormous. Further, whenever the number of robots increases by one, the number of states increases by 8000 times. As described in the paragraph [Problem Setting] of the present embodiment, in a case where a constraint condition that robots are in contact with each other is taken into consideration, searching calculation has to be performed in consideration of mutual movement of the robots. Thus, it is difficult to basically reduce the amount of calculation, which results in a large problem in a case where a plurality of robots are used.

Characteristics in Non Patent Literature 2

In heterogeneous formation control disclosed in Non Patent Literature 2, the concept of void control is introduced as one of the measures for solving the above-described computational load problem. In addition, the concept of an 8-box robot unit has also been introduced to overcome the problem of formation deformation as described in the [Problem Setting].

Figure 3:
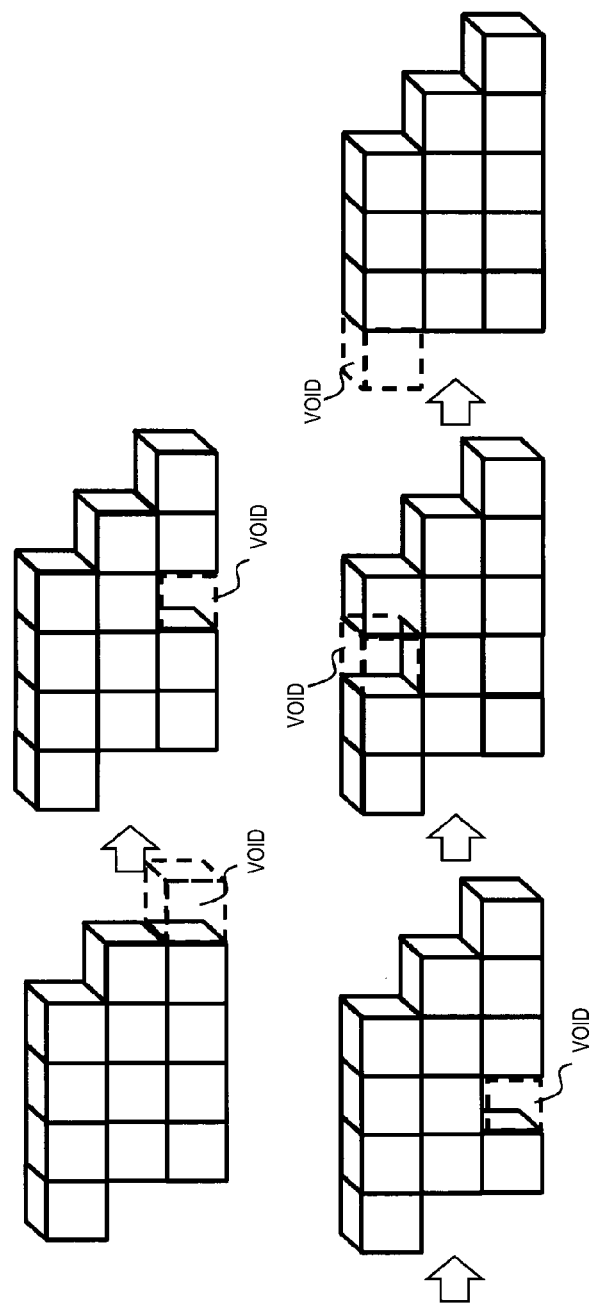
FIG. 3 is a diagram illustrating the state of movement of a void.

First, void control will be described. Here, the term "void" mentioned herein refers to a void formed at the original position of a certain robot after the robot has moved to another position, for example, as illustrated in FIG. 3. In other words, a void is a virtual being that moves in a direction opposite to a direction in which the robot moves. In such a formation problem of a robot group, the amount of searching calculation explodes due to focusing on operations of a plurality of robots. However, considering the movement of a void by changing the point of view, a problem of an operation plan of a large number of robots can be considered as an operation plan of a single void, which is suitable for a reduction in a load of searching calculation. In addition, this is not applicable in a case where an initial position and a target position have a common portion and the common portion is divided into a plurality of non-connected portions.

Homogeneous Formation Control A homogeneous robot formation control method for disposing each robot unit j at any position $(Xr\_ue[j], Yrue[j], Zr\_ue[j])$ in a set G of target positions from a state where each robot unit j is present at any position in a set S of initial positions will be described below. Note that, hereinafter, a set S of initial positions may be abbreviated as an initial position S, and a set G of target positions may be abbreviated as a target position G.

Here, it is assumed that the set S of initial positions and the set G of target positions are constituted by an 8-box robot unit. As illustrated in FIG. 4, a method referred to as tunneling is used to deform a robot structure in the state of the set S of initial positions to the state of the set G of target positions. In an operation illustrated in FIG. 4, a series of robot units connecting a head robot unit Head and a tail robot unit Tail operate in such a manner as to follow the operation of the head robot unit Head in the form of a so-called snake. Note that, even in a robot structure using a robot unit of 2×2×2 using a robot performing other tunneling, for example, an extension and contraction robot as disclosed in Non Patent Literature 1, this tunneling operation is similar, and a method of selecting a head robot unit Head and a tail robot unit Tail of tunneling shown in the present disclosure can be similarly applied. Regarding formation deformation using tunneling, a formation deformation operation can be executed without using positions other than a set of initial positions and a set of target positions even in an environment with obstacles.

A tunneling operation in an 8-box robot unit used in the present disclosure uses, for example, a void control method disclosed in Non Patent Literature 2. Tunneling is performed using an operation of moving a void generated in a head robot unit Head when a robot in the head robot unit Head moves into an objective position D to the position of Tail and discharging the void out of a robot structure. When the head robot unit Head and the tail robot unit Tail are adjacent to each other, the order of void generation in the head robot unit Head for preventing non-connection between robots from occurring is defined in Non Patent Literature 2.

In a method of the related art, there is no particular limitation except for the position a robot unit which is adjacent to an unfilled position in a target position G in selecting a head robot unit Head. On the other hand, regarding the selection of a tail robot unit Tail, a device for maintaining the connectivity of a robot structure in a case where the tail robot unit Tail is removed from a robot within an initial position S is required, but this also is solved by a method of the related art as long as there is one common portion between the initial position S and the target position G. In this case, the following Equation (1) is useful as a condition regarding whether or not a robot structure can maintain connectivity when a robot unit j within the initial position S is removed from the robot structure.

$$\delta(j) > \delta(j\_n) \qquad (1)$$

Here, $\delta(j)$ is a Manhattan distance in the robot structure from the head robot unit Head of the robot unit j. In addition, j_n is the number of a robot unit adjacent to the robot unit j. When Equation (1) is established for all of the robot units j_n, the connectivity of the robot structure can be maintained even when the robot unit j is removed from the robot structure. That is, a robot unit satisfying Equation (1) may be selected as the tail robot unit Tail. In short, there is no problem as long as $\delta$ selects the largest robot unit as the tail robot unit Tail at all times.

Subsequently, a method of selecting a head robot unit Head and a tail robot unit Tail in the present disclosure will be described. It is assumed that a common portion between an initial position and a target position is divided into Ncommon portions, and the portions are referred to as partial common position sets C[1], C[2], and C[3], . . . , and C[Ncommon]. That is, it is assumed that a set of common positions is constituted by at least one partial common position set which is not adjacent to a partial common position set, and the at least one partial common position set is C[1], C[2], C[3], . . . , or C[Ncommon].

First, regarding the selection of a head robot unit Head, it has to be noted that none of the Ncommon partial common position sets from the entire robot structure is disconnected from the robot structure during a deformation operation. For example, when a robot within the initial position S is gradually moved into the target position G, the number of robots remaining within the initial position S decreases.

When little attention is given in this process, a situation may occur in which there is no robot which is usable to connect a common portion in robots within the initial position S and robots within the target position G. In addition, even when the head robot unit Head is selected from the target position G and the tail robot unit Tail is selected from the initial position S, a common portion between the initial position S and the target position G can also serve as both the initial position S and the target position G. For this reason, when control which is appropriate therefor is not performed, there is also a concern that infinite selection loops of the head robot unit Head and the tail robot unit Tail may be generated. In order to avoid them, the following new rules (1) to (4) are provided.

(1) During a deformation operation, a set of positions of robot units filled by tunneling with an objective position D of the head robot unit Head as a target position is set to be Up. That is, only a robot unit at a position belonging to the set Up can be selected as the head robot unit Head at any time. Note that processing corresponding to the rule (1) is performed during the process of step S6 by a first head robot determination command transmission unit 6 and during the process of step S23 by a second head robot determination command transmission unit 23 to be described later.

(2) Only a robot unit located at a position belonging to S-Up (in other words, a robot unit located at a position that does not belong to the set Up and located within the initial position) can be selected as the tail robot unit Tail at any time. Note that processing corresponding to the rule (2) is performed during the process of step S7 performed by a void generation order determination unit 7 to be described later.

(3) At a point in time when a deformation operation is started, the positions of all robot units belonging to any one C[i_start] among C[1], C[2], C[3], . . . , and C[Ncommon] of the set Up are added to the set Up. Note that process corresponding to the rule (3) is performed during the process of step S6 performed by the first head robot determination command transmission unit 6.

(4) In a case where the set Up comes into contact with any one of the robot units within C[i_connected] during a deformation operation, the positions of the robot units within the C[i_connected] in a connected state from the set Up are all added to the set Up within the set G of target positions. C[i_connected] is a partial common position set which newly comes into contact with the robot unit within Up during the deformation operation. For example, in FIG. 8(G) to be described later, C(2) is C[i_connected]. Note that processing corresponding to the rule (4) is performed during the process of step S22 performed by a set updating unit 22 to be described below.

The rules (1) and (2) are rules for performing control regarding as if only the set Up is the only connected portion between the target position G and the initial position S during tunneling, thereby creating a state in which the Equation (1) is applicable during the deformation operation. The rule (3) is a rule for securing an option of the head robot unit Head when a formation deformation operation is started. The rule (4) is a rule, when C[i_start] and another partial common position set are connected to each other through the target position G and treated as one connected portion, for adding the connected partial common position set to the set Up as an option of the head robot unit Head.

According to the rules (1) to (4), it is possible to achieve formation control which is applicable even when there is a non-connection location in a common portion between an initial position of a robot unit and a target position of the robot unit.

When the above-described tunneling operation is repeatedly performed until all robot units j within the initial position S arrive at the target position G, the homogeneous formation control is completed.

An embodiment of a mobile robot and a mobile robot control method for achieving the above-described method by an algorithm based on a distributed control method will be described below.

Embodiment

Figure 5:
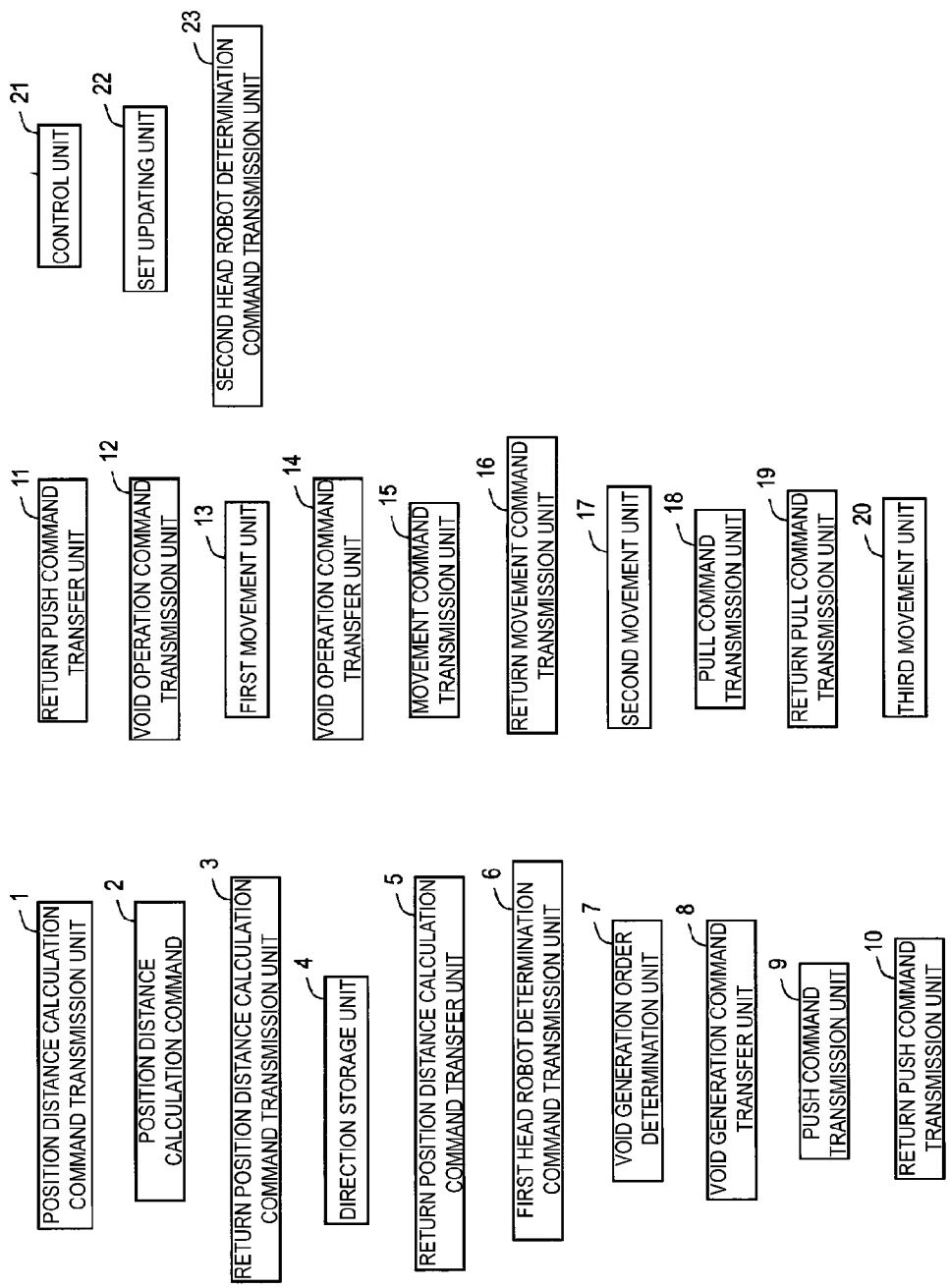
FIG. 5 is a block diagram illustrating an example of a mobile robot.

As illustrated in FIG. 5, each mobile robot includes, for example, a position distance calculation command transmission unit 1, a position distance calculation command transfer unit 2, a return position distance calculation command transmission unit 3, a direction storage unit 4, a return position distance calculation command transfer unit 5, a first head robot determination command transmission unit 6, a void generation order determination unit 7, a void generation command transfer unit 8, a push command transmission unit 9, a return push command transmission unit 10, a return push command transfer unit 11, a void operation command transmission unit 12, a first movement unit 13, a void operation command transfer unit 14, a movement command transmission unit 15, a return movement command transmission unit 16, a second movement unit 17, a pull command transmission unit 18, a return pull command transmission unit 19, a third movement unit 20, a control unit 21, a set updating unit 22, and a second head robot determination command transmission unit 23.

Figure 6:
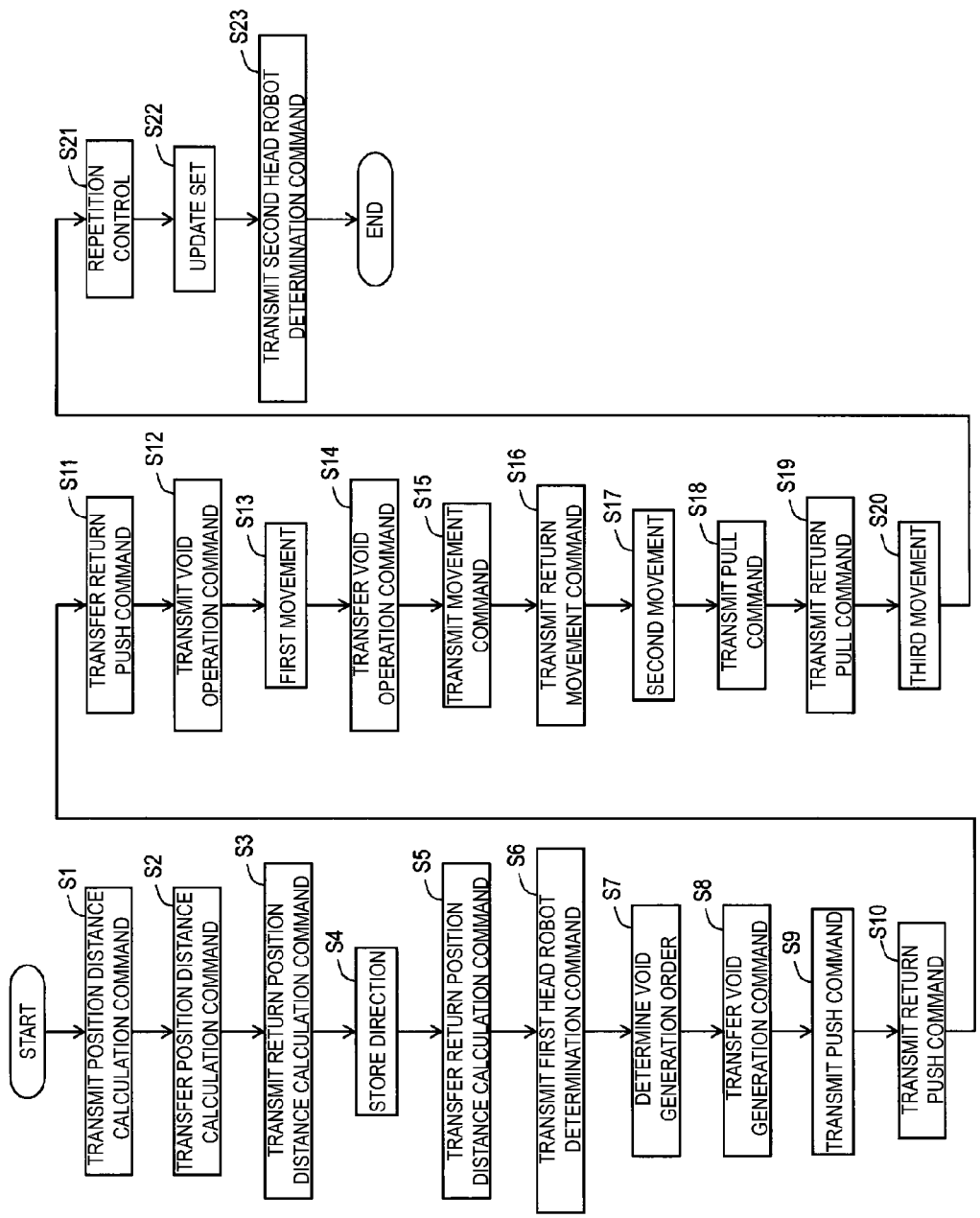
FIG. 6 is a flowchart illustrating an example of a mobile robot control method.

The mobile robot control method is achieved by the units of the mobile robot performing, for example, the processes of steps S1 to S23 illustrated in FIG. 6 and described below.

The processes of steps S1 to S6 are processes for ascertaining a formation structure at the initial position S. The processes of steps S7 to S23 are processes for performing a tunneling operation.

Hereinafter, a robot at a predetermined position in a robot unit will be referred to as a center robot. For example, a center robot is used in which the X, Y, and Z position coordinates in the robot unit are all even.

First, a deformation start command is transmitted from a user to a robot i_root at a predetermined root position. The predetermined root position is, for example, the position of the center robot included in a predetermined robot unit. It is assumed that the deformation start command includes formation form information, which is information regarding a target position G of each robot.

Position Distance Calculation Command Transmission Unit 1

In a case where the robot receiving the deformation start command is a robot i_root at a predetermined root position, the position distance calculation command transmission unit 1 transmits a position distance calculation command including a relative position from the predetermined root position and the number of times of transmission and transfer, which are respectively set to predetermined initial values, to an adjacent robot (step S1).

Hereinafter, a position distance calculation command may be referred to as a position distance calculation command MANHATTAN_COM, a relative position may be referred to as a relative position (Xr, Yr, Zr), and the number of times of transmission and transfer may be referred to as the number of times of transmission and transfer N_manhattan.

For example, the initial value of the relative position (Xr, Yr, Zr) is (0, 0, 0), and the initial value of the number of times of transmission and transfer N_manhattan is 0.

Position Distance Calculation Command Transfer Unit 2

In a case where the robot has received the position distance calculation command, the position distance calculation command transfer unit 2 increments the number of times of transmission and transfer included in the position distance calculation command, updates a relative position included in the position distance calculation command in accordance with a direction in which the position distance calculation command is received, and transfers only once the position distance calculation command, including the incremented number of times of transmission and transfer and the updated relative position, to an adjacent robot other than robots transmitting the position distance calculation command (step S2).

For example, in a case where a position distance calculation command is received through communication in the positive X-direction, in other words, in a case where the position distance calculation command is received from a robot to come into contact in the negative X-direction, Xr of a relative position (Xr, Yr, Zr) included in the position distance calculation command is incremented by one. In addition, for example, in a case where a position distance calculation command is received through communication in the negative X-direction, in other words, in a case where the position distance calculation command is received from a robot to contact in the positive X-direction, Xr of a relative position (Xr, Yr, Zr) included in the position distance calculation command is decremented by one.

Note that the position distance calculation command transfer unit 2 does not transfer the position distance calculation command MANHATTAN_COM to the robot transmitting the position distance calculation command to the robot itself. Thereby, it is possible to prevent the position distance calculation command MANHATTAN_COM from being transmitted and received indefinitely in a robot structure.

Return Position Distance Calculation Command Transmission Unit 3

In a case where the robot has first received the position distance calculation command, the return position distance calculation command transmission unit 3 transmits a return position distance calculation command including the incremented number of times of transmission and transfer and the updated relative position to the robot that has transmitted the position distance calculation command (step S3).

Hereinafter, the return position distance calculation command may also be referred to as a return position distance calculation command RETURN_MANHATTAN_COM.

The value of the number of transmission transfers N_manhattan at the time of first receiving the position distance calculation command MANHATTAN_COM is a Manhattan distance from the robot i_root of the robot.

Direction Storage Unit 4

In a case where the robot has first received the position distance calculation command, the direction storage unit 4 stores the direction of the robot transmitting the position distance calculation command as a root direction (step S4).

Thereafter, when each robot transmits some information to the robot i_root, the robot transmits the information in each root direction.

Return Position Distance Calculation Command Transfer Unit 5

In a case where the robot has received the return position distance calculation command, the return position distance calculation command transfer unit 5 transfers the received return position distance calculation command in a root direction read from the direction storage unit 4 (step S5).

The robots receiving the respective return position distance calculation commands perform the process of step S5, whereby the return position distance calculation commands finally reach the robot i_root.

First Head Robot Determination Command Transmission Unit 6

In a case where the robot i_root has received the return position distance calculation commands transmitted by all of the robots, the first head robot determination command transmission unit 6 selects any one partial common position set as the set Up based on the positions of the robots based on the initial position, the target position, and the relative position included in the return position distance calculation command. Next, the first head robot determination command transmission unit 6 selects a robot unit adjacent to a position with no robot unit which is located at a position belonging to the set Up and located at the target position (hereinafter, referred to as an objective position D) as a head robot unit Head. Next, the first head robot determination command transmission unit 6 transmits a head robot determination command including the positions of the robots and information regarding the set Up to a predetermined robot h included in the selected head robot unit Head (step S6).

The predetermined robot h is, for example, a robot center in the selected head robot unit Head.

The first head robot determination command transmission unit 6 may select any partial common position set C[1], C[2], C[3], . . . , and C[Ncommon] as the set Up. For example, the first head robot determination command transmission unit 6 initializes the set Up by setting any one value among 1 to Ncommon as i_start and selecting all of the positions belonging to the partial common position set C[i_start] as the set Up.

Hereinafter, the first head robot determination may be referred to as a head robot determination command HEAD_DECISION_COM.

In this manner, the robot i_root receives return position distance calculation commands RETURN_MANHATTAN_COM from the robots to ascertain a formation structure at the current initial position S. In addition, the robot i_root initializes the set Up to determine the first head robot unit Head, and transmits the head robot determination command HEAD_DECISION_COM to the robot h within the first head robot unit Head.

Void Generation Order Determination Unit 7

In a case where the robot h has received a head robot determination command, the void generation order determination unit 7 determines an objective position D, a tail robot unit Tail, which is a robot unit located at a position not belonging to the set Up, located at an initial position, and capable of maintaining connectivity of a robot structure even when moved, a path from a head robot unit Head to the tail robot unit Tail, and a void generation order for the robots in the head robot unit Head based on the positions of the robots and the information regarding the set Up (step S7).

Here, a case where robot units form a robot structure of one block by being adjacent to other robot units will be referred to the connectivity of the robot structure.

For example, the void generation order determination unit 7 selects any robot unit which is located at a position within the initial position S and not located in the set Up and satisfies Equation (1), and sets the robot unit to be a tail robot unit Tail.

The robot h determines a void generation order within the head robot unit Head in accordance with a direction ah, which is the direction of a head robot unit Head and a direction at which is a moving direction of the tail robot unit Tail using, for example, a method disclosed in Non Patent Literature 2.

Void Generation Command Transfer Unit 8

In a case where a robot located within the position of a robot unit Head or the position of D has received a void generation command, the void generation command transfer unit 8 transfers the void generation command to an adjacent robot until the void generation command reaches a robot v1 located at a position where a void is generated (step S8).

Hereinafter, a void generation command may be referred to as a void generation command VOID_GENERATE_COM.

For example, the void generation command VOID_GENERATE_COM is transferred inside the head robot unit Head through a route such as one stroke, as illustrated in FIG. 7(A). The void generation command VOID_GENERATE_COM is continuously transferred until the void generation command arrives at the robot v1 located at the first void position in the transfer route thereof. In FIG. 7(A), the void generation command VOID_GENERATE_COM is transferred in the order of a robot with 4, a robot with 0, a robot with 7, a robot with 3, a robot with 2, a robot with 5, a robot with 6, and a robot with 1. Note that, although an example of the generation of a first void is described, the robot h may be moved from the original position through void control in a case where a second void and the subsequent voids are generated. In this case, the robot h stores the amount of movement thereof and first transfers the void generation command to a robot with 4 as illustrated in FIG. 7(A) based on the stored amount of movement.

Push Command Transmission Unit 9

In a case where the robot v1 has received a void generation command, the push command transmission unit 9 transmits a push command to an adjacent robot in an ah direction (step S9).

Figure 7:
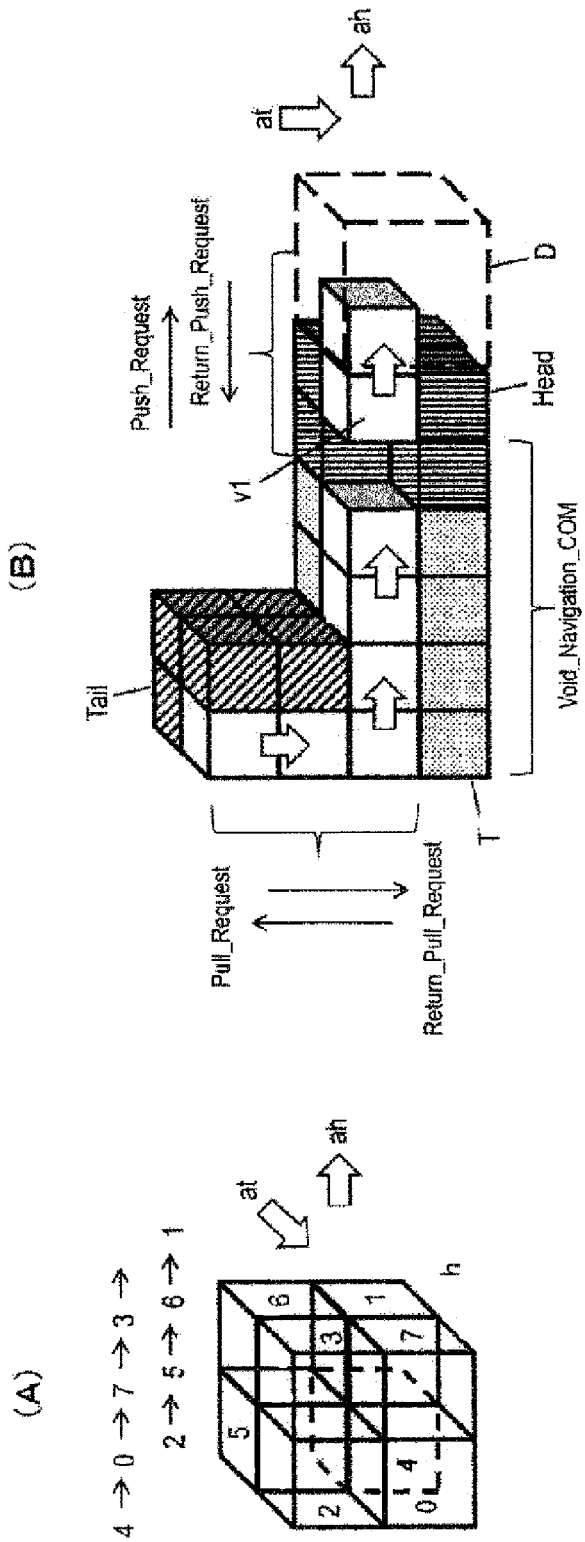
FIG. 7 is a diagram illustrating a specific example of control processing.

The ah direction is the direction of a head robot unit Head, in other words, a movement direction of the head robot unit Head. In the example illustrated in FIG. 7, the right direction of the page of FIG. 7 is the ah direction.

Hereinafter, a push command may be referred to as a push command PUSH_REQUEST.

Return Push Command Transmission Unit 10

In a case where a push command is received and there is an adjacent robot in the ah direction, the return push command transmission unit 10 transfers the push command to the adjacent robot in the ah direction, and in a case where a push command is received and there is no robot adjacent thereto in the ah direction, the return push command transmission unit 10 transmits the return push command to the adjacent robot in a direction opposite to the ah direction (step S10).

The robots perform the process of step S10, so that a push command is transferred until the push command reaches a robot having no adjacent robot in the ah direction, and a return push command is transmitted from a robot having no adjacent robot in the ah direction.

Note that, when mechanical connection to an adjacent robot is not released, in a case where independent movement cannot be performed or in a case where it is difficult to achieve a simultaneous operation with the robot transmitting the push command in terms of hardware design of a robot. the robot receiving the push command PUSH_REQUEST releases mechanical connection to a robot other than the robot which is in contact therewith in the ah direction.

Hereinafter, the return push command may also be referred to as a return push command RETURN_PULL_REQUEST.

Return Push Command Transfer Unit 11

In a case where the robot has received the return push command, the return push command transfer unit 11 transfers the return push command to an adjacent robot in a direction opposite to the ah direction until the return push command reaches the robot v1 (step S11).

Void Operation Command Transmission Unit 12

In a case where the robot v1 has received a return push command, the void operation command transmission unit 12 transmits a void operation command to a robot located on a path and adjacent to v1 with a direction in which the tail robot unit Tail performs a tunneling operation as an at direction (step S12).

In the example illustrated in FIG. 7, an upward direction in the paper of FIG. 7 is the at direction.

Hereinafter, the void operation command may also be referred to as a void operation command VOID_NAVIGATE_COM.

It is assumed that the void operation command VOID_NAVIGATE_COM includes information on a path from the head robot unit Head to the tail robot unit Tail. Here, the information on the path is a row of robot positions included in the path followed by a void. For example, each robot position is set to be p[ip] (ip=1, 2, 3, 4 . . . ), and p[0] includes the position of the robot v1. A void operation command transmitted by the robot v1 is the position of a robot stored in p[1].

First Movement Unit 13

In a case where the robot v1 has received a return push command and after the robot has transmitted the void operation command, the first movement unit 13 moves the robot v1 in the ah direction (step S13).

The movement of the robot v1 in the ah direction is performed by one step. In other words, the movement of the robot v1 in the ah direction is performed by the size of one robot. In this case, the robot v1 moves together with a robot which is adjacent to the robot v1 in the ah direction by pushing the robot adjacent to the robot v1 in the ah direction.

For example, as illustrated in FIG. 5(B), the robot v1 moves in the ah direction through the processing of the first movement unit 13. As a result, a void is generated at a position where the robot v1 was present. Note that, in FIG. 5(B), a position indicated by a dashed line represents an objective position D, a cube indicated by vertical lines represents a head robot unit Head, a cube indicated by diagonal lines represents a tail robot unit Tail, and a cube indicated by dots represents a robot unit other than the head robot unit Head and the tail robot unit Tail. In addition, a cube indicated in a white color represents an example of a robot unit that moves through one processing from step S7 to step S20.

Void Operation Command Transfer Unit 14

In a case where the robot located at the position of p[i] within the path has received the void operation command, the void operation command transfer unit 14 transfers the void operation command to a robot located on the path and at the position of p[I+1] within the path (step S14).

The robots perform the process of step S14, so that the void operation command VOID_NAVIGATE_COM is transferred until it reaches a robot included in a robot unit T' which is one robot unit before the tail robot units Tail.

Movement Command Transmission Unit 15

In a case where the robot located at the position of p[i] within the path has received the void operation command and the number of times of transmission and transfer of the void operation command is a predetermined number of times, the movement command transmission unit 15 transmits a movement command to the robot that has transmitted the void operation command (step S15).

The predetermined number of times is an even number, for example, in the case of 8-box robot units dealt with here. (In this case, i is an odd number).

Hereinafter, the movement command may also be referred to as a movement command PUSH_ONE_REQUEST.

Return Movement Command Transmission Unit 16

In a case where the robot has received the movement command, the return movement command transmission unit 16 transmits a return movement command to the robot that has transmitted the movement command (step S16).

Hereinafter, the return movement command may also be referred to as a return movement command RETURN_PUSH_ONE_REQUEST.

Note that, when mechanical connection to an adjacent robot is not released, in a case where independent movement cannot be performed or in a case where it is difficult to achieve a simultaneous operation with the robot transmitting the void operation command in terms of hardware design of a robot, the robot receiving the movement command PUSH_ONE_REQUEST releases mechanical connection to a robot other than the robot transmitting the movement command PUSH_ONE_REQUEST and then transmits a return movement command RETURN_PUSH_ONE_REQUEST.

Second Movement Unit 17

In a case where the robot has received the return movement command, the second movement unit 17 moves the robot itself in a direction in which there is a robot transmitting the void operation command when seen from the robot itself, together with the robot transmitting the void operation command (step S17).

In other words, the robot receiving the return movement command RETURN_PUSH_ONE_REQUEST moves the robot transmitting the void operation command VOID_NAVIGATE_COM to the robot itself, while pushing the robot transmitting the void operation command by one step.

Pull Command Transmission Unit 18

In a case where a robot, which is included in the robot unit T' which is one robot unit before the tail robot unit Tail in the tunneling operation and has the position within the robot unit being the same as that of the robot v1, has received the void operation command, the pull command transmission unit 18 transmits a pull command to a robot which is adjacent thereto in a direction opposite to the at direction (step S18).

Hereinafter, the pull command may also be referred to as a pull command PULL_REQUEST.

In a case where the robot is included in the robot unit T' which is one robot unit before the tail robot unit Tail and has received the void operation command and in a case where the number of times of transmission and transfer of the void operation command is a predetermined number of times (for example, an even number in the case of 8-box units), it is assumed that the process of step S18 is performed and then the processes of steps S15 to S17 are performed.

That is, in this case, the robot transmits the pull command PULL_REQUEST to a robot which is adjacent thereto in the at direction (step S18), transmits the movement command PUSH_ONE_REQUEST to the robot that has transmitted the command VOID_NAVIGATE_COM to the robot itself (step S15), and performs a pushing operation through the processes of steps S16 and S17.

Return Pull Command Transmission Unit 19

In a case where the robot has received the pull command and there is a robot adjacent in a direction opposite to the at direction within the tail robot unit Tail, the return pull command transmission unit 19 transfers the pull command to the robot which is adjacent to the robot in a direction opposite to the at direction. In a case where the robot has received the pull command and there is no robot adjacent thereto in a direction opposite to the at direction within the tail robot unit Tail, the return pull command transmission unit 19 transmits a return pull command to the adjacent robot in the at direction (step S19).

Hereinafter, the return pull command may also be referred to as a return pull command RETURN_PULL_REQUEST.

Note that, when mechanical connection to an adjacent robot is not released, in a case where independent movement cannot be performed or in a case where it is difficult to achieve a simultaneous operation with the robot transmitting the return pull command in terms of hardware design of a robot, the robot receiving the pull command PULL_REQUEST releases mechanical connection to a robot other than the robot transmitting the pull command PULL_REQUEST and then transfers the pull command PULL_REQUEST or transmits the return pull command RETURN_PULL_REQUEST.

Third Movement Unit 20

In a case where the robot has received the return pull command, the third movement unit 20 moves the robot in the at direction together with the robot that has transmitted the return pull command (step S20).

A cube indicated in a white color represents an example of a robot that moves through one processing from step S7 to step S20.

Control Unit 21

The control unit 21 of the robot h performs control so that all of the robots included in the head robot unit Head repeat the processing of each of the void generation order determination unit 7, the void generation command transfer unit 8, the push command transmission unit 9, the return push command transmission unit 10, the return push command transfer unit 11, the void operation command transmission unit 12, the first movement unit 13, the void operation command transfer unit 14, the movement command transmission unit 15, the return movement command transmission unit 16, the second movement unit 17, the pull command transmission unit 18, the return pull command transmission unit 19, and the third movement unit 20 until the robots move to the objective position D (step S21).

For example, after a fixed period of time has elapsed (for example, after a void within the head robot unit Head has disappeared) since the robot h has transmitted a first void generation command VOID_GENERATE_COM, the robot transmits a second void generation command VOID_GENERATE_COM. Similarly, when the void generation command VOID_GENERATE_COM is transferred inside the head robot unit Head and a robot located at a position where the second void is generated receives the void generation command, void control is performed in a manner similar to the first void. In this manner, eight voids are generated, and thus the processes of steps S7 to S20 are repeatedly performed until the robot within the head robot unit Head moves to the objective position D.

Set Updating Unit 22

The set updating unit 22 of the robot h adds the objective position D to the set Up, and in a case where there is a robot unit which is in contact with the set Up and located within the target position instead of within the set Up, the set updating unit updates the set Up by adding the position of the robot unit and the position of the robot unit in a connected state through only the target position from the robot unit to the set Up (step S22).

Specifically, the set updating unit 22 adds the objective position D to the set Up, and in a case where there is a robot unit j which is in contact with the set Up, not included in the set Up, and located within the target position G, the set updating unit updates the set Up by adding the position of the robot unit j and the positions of all of the robot units in a connected state through only the target position G (including a common position) from the robot unit j to the set Up.

Second Head Robot Determination Command Transmission Unit 23

The second head robot determination command transmission unit 23 of the robot h updates the position of the tail robot unit Tail and the position of the robot located at the objective position D, and in a case where there is a robot unit which is located at a position belonging to the set Up and adjacent to a position where a robot unit is not present within the target position, the second head robot determination command transmission unit selects the robot unit as a new head robot unit Head based on the updated positions of the robots. Next, the second head robot determination command transmission unit 23 of the robot h transmits, to a predetermined new robot h included in the newly selected head robot unit Head, a head robot determination command including the updated positions of the robots and information on the updated set Up (step S23).

Thereafter, the process of step S7 and the subsequent processes are performed.

In a case where there is no position where a robot within the target position is no present, the second head robot determination command transmission unit 23 terminates the processing.

In this manner, control is performed to repeat the processing of each of the void generation order determination unit 7, the void generation command transfer unit 8, the push command transmission unit 9, the return push command transmission unit 10, the return push command transfer unit 11, the void operation command transmission unit 12, the first movement unit 13, the void operation command transfer unit 14, the movement command transmission unit 15, the return movement command transmission unit 16, the second movement unit 17, the pull command transmission unit 18, the return pull command transmission unit 19, the third movement unit 20, the control unit 21, the set updating unit 22, and the second head robot determination command transmission unit 23 until there is no more position where a robot within the target position.

With such a configuration, it is possible to perform homogeneous formation control even under an environment with an obstacle even when there is a non-connection portion in a common portion between a set of initial positions and a set of target positions from a formation state at any initial position to a formation state at any target position while taking the presence of a large number of robot units into account and maintaining a state where the robot units are in contact with each other. In addition, it is possible to perform formation control even in a case where there is a non-connection location in a portion where a common position is removed from the set of target positions.

Specific Example

Figure 8:
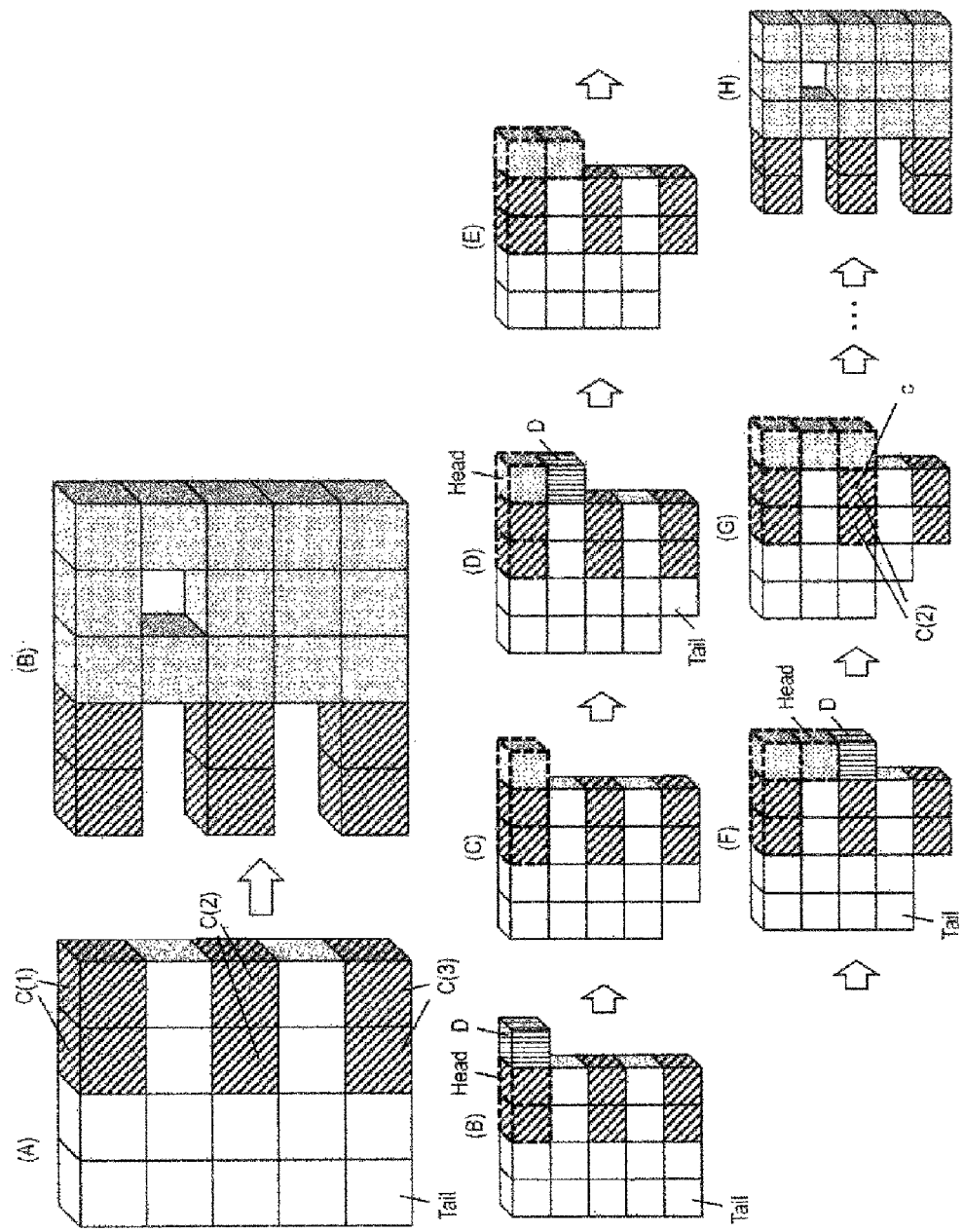
FIG. 8 is a diagram illustrating a specific example of control processing.

Specific examples of the mobile robot and the mobile robot control method will be described using FIG. 8.

FIG. 8(A) illustrates an initial position of a robot unit, and FIG. 8(B) illustrates a target position of the robot unit. In FIGS. 8(A) and (B), a white cube and a cube with diagonal lines represent an initial position of a robot unit, and a cube with dots and a cube with diagonal lines represent a target position of a robot unit. The cube with diagonal lines represents a common position which is a common portion between an initial position and a target position of a robot unit.

In FIG. 8(A), a set of common positions is constituted by three partial common position sets C(1), C(2), and C(3) that are not adjacent to each other. In FIG. 8(A), the positions of two uppermost cubes with diagonal lines are C(1), the positions of two intermediate cubes with diagonal lines are C(2), and the positions of two lowermost cubes with diagonal lines are C(3).

The first head robot determination command transmission unit 6 selects the partial common position set C(1) as a set Up, for example, as illustrated in FIG. 8(B). In FIGS. 8(B) to 8(G), positions belonging to the set Up are indicated by a bold dashed line.

The first head robot determination command transmission unit 6 and the void generation order determination unit 7 select a head robot unit Head, a tail robot unit Tail, and an objective position D, for example, as illustrated in FIG. 8(B).

The void generation order determination unit 7, the void generation command transfer unit 8, the push command transmission unit 9, the return push command transmission unit 10, the return push command transfer unit 11, the void operation command transmission unit 12, the first movement unit 13, the void operation command transfer unit 14, the movement command transmission unit 15, the return movement command transmission unit 16, the second movement unit 17, the pull command transmission unit 18, the return pull command transmission unit 19, the third movement unit 20, and the control unit 21 move a series of robot units from the head robot unit Head to the tail robot unit Tail with the objective position D in FIG. 8(B) as an objective position. As a result, the positions of the robot units are as illustrated in FIG. 8(C).

The set updating unit 22 adds the objective position D in FIG. 8(B) to the set Up. In this case, there is no robot unit which is in contact with the set Up and located within a target position instead of within the set Up, and thus positions other than the objective position D are not added to the set Up. As a result, positions belonging to the set Up are as illustrated in FIG. 8(C).

A position where a robot is not present within the target position remains, and thus the processing returns to the process of step S23.

For example, as illustrated in FIG. 8(D), the second head robot determination command transmission unit 23 selects a head robot unit Head, a tail robot unit Tail, and an objective position D.

The void generation order determination unit 7, the void generation command transfer unit 8, the push command transmission unit 9, the return push command transmission unit 10, the return push command transfer unit 11, the void operation command transmission unit 12, the first movement unit 13, the void operation command transfer unit 14, the movement command transmission unit 15, the return movement command transmission unit 16, the second movement unit 17, the pull command transmission unit 18, the return pull command transmission unit 19, the third movement unit 20, and the control unit 21 move a series of robot units from the head robot unit Head to the tail robot unit Tail with the objective position D in FIG. 8(D) as an objective position. As a result, the positions of the robot units are as illustrated in FIG. 8(E).

The set updating unit 22 adds the objective position D in FIG. 8(D) to the set Up. In this case, there is no robot unit which is in contact with the set Up and located within a target position instead of within the set Up, and thus positions other than the objective position D are not added to the set Up. As a result, positions belonging to the set Up are as illustrated in FIG. 8(E).

A position where a robot is not present within the target position remains, and thus the processing returns to the process of step S23.

For example, as illustrated in FIG. 8(F), the second head robot determination command transmission unit 23 selects a head robot unit Head, a tail robot unit Tail, and an objective position D.

The void generation order determination unit 7, the void generation command transfer unit 8, the push command transmission unit 9, the return push command transmission unit 10, the return push command transfer unit 11, the void operation command transmission unit 12, the first movement unit 13, the void operation command transfer unit 14, the movement command transmission unit 15, the return movement command transmission unit 16, the second movement unit 17, the pull command transmission unit 18, the return pull command transmission unit 19, the third movement unit 20, and the control unit 21 move a series of robot units from the head robot unit Head to the tail robot unit Tail with the objective position D in FIG. 8(F) as an objective position. As a result, the positions of the robot units are as illustrated in FIG. 8(G).

The set updating unit 22 adds the objective position D in FIG. 8(F) to the set Up. In this case, there is a robot unit which is in contact with the set Up and located within a target position instead of within the set Up (a robot unit located at a position indicated by c in FIG. 8(G)). For this reason, in this case, the set updating unit 22 adds, to the set Up, the position c and the position (that is, a position belonging to the partial common position set C(2) excluding the position c) of a robot unit in a connected state through only the target position (including a common position) from the robot unit located at the position c. As a result, positions belonging to the set Up are as illustrated in FIG. 8(G). Note that, in this case, C[2] is C[i_connected]. C[2] which is C[i_connected] is added to the set Up through the process of step S4.

Such processing is repeated, and finally, robot units can be moved to their target positions as illustrated in FIG. 8(H).

Deformation Example and the Like

Although a so-called 8-box sliding cube is used as a robot unit in the above-described embodiment, a robot unit constituted by a plurality of robots, such as a 27-box sliding cube, may be used.

Program and Recording Medium

In a case where processing in each unit of a mobile robot is achieved by a computer, processing contents of a function that each unit of the mobile robot should have are described by a program. In addition, the processing of each unit is achieved on the computer by executing the program by the computer.

The program having the processing contents described therein can be recorded on a computer-readable recording medium. As the computer-readable recording medium, for example, any recording medium such as a magnetic recording apparatus, an optical disk, a magneto-optical recording medium, and a semiconductor memory may be used.

Additionally, the processing of each unit may be configured by executing a predetermined program on a computer, or at least some of these processing operations may be achieved by hardware.

In addition, it is needless to say that modifications can be made appropriately without departing from the spirit of the present disclosure.

REFERENCE SIGNS LIST

1 Position distance calculation command transmission unit
2 Position distance calculation command transfer unit
3 Return position distance calculation command transmission unit
4 Direction storage unit
5 Return position distance calculation command transfer unit
6 First head robot determination command transmission unit
7 Void generation order determination unit
8 Void generation command transfer unit
9 push command transmission unit
10 return push command transmission unit
11 Return push command transfer unit
12 Void operation command transmission unit
13 First movement unit
14 Void operation command transfer unit
15 movement command transmission unit
16 return movement command transmission unit
17 Second movement unit
18 pull command transmission unit
19 return pull command transmission unit
20 Third movement unit
21 Control unit
22 Set updating unit
23 Second head robot determination command transmission unit

The invention claimed is:

1. A mobile robot that moves from a predetermined initial position to a predetermined target position, the mobile robot including a plurality of robot units, each of the robot units including a plurality of robots, a robot structure of one block including each of the robot units adjacent to another robot unit referred to as connectivity of the robot structure, a common portion between the initial position and the target position set to be a common position, and the common position including a set of one or more partial common positions, and each of the plurality of robots comprising:

a position distance calculation command transmitter configured to transmit, in a case where the robot is a robot i_root located at a predetermined root position, a position distance calculation command including a relative position from the predetermined root position and the number of times of transmission and transfer of a position distance calculation command, which are respectively set to predetermined initial values, to an adjacent robot;

a position distance calculation command transferer configured to increment, in a case where the position distance calculation command is received, the number of times of transmission and transfer included in the position distance calculation command, update a relative position included in the position distance calculation command in accordance with a direction in which the position distance calculation command is received, and transfer a position distance calculation command including the incremented number of times of transmission and transfer and the updated relative position to an adjacent robot, other than the robot transmitting the position distance calculation command, only once;

a return position distance calculation command transmitter configured to transmit, in a case where the position distance calculation command is initially received, a return position distance calculation command including the incremented number of times of transmission and transfer and the updated relative position to the robot transmitting the position distance calculation command;

a direction store configure to store, in a case where the position distance calculation command is initially received, a direction of the robot transmitting the position distance calculation command as a root direction;

a return position distance calculation command transferer t configured to transfer, in a case where the return position distance calculation command is received, the received return position distance calculation command in the root direction read from the direction storage unit;

a first head robot determination command transmitter configured to select, in a case where the robot is the robot i_root and the return position distance calculation commands transmitted by all of the robots have been received, any one partial common position set as a set Up based on the positions of the robots based on the initial position, the target position, and the relative position included in the return position distance calculation command, select a robot located in a direction approaching the tail robot unit Tail by one box from the robot itself within the path;

a movement command transmitter configured to transmit, in a case where the void operation command is received and the number of times of transmission and transfer of the void operation command is a predetermined number of times, a movement command to a robot transmitting the void operation command;

a return movement command transmitter configured to transmit, in a case where the movement command is received, a return movement command to a robot transmitting the movement command;

a second mover configured to move, in a case where the return movement command is received, the robot in a direction of a robot transmitting the void operation command together with the robot transmitting the void operation command;

a pull command transmitter configured to transmit, in a case where the robot is a robot which is included in a robot unit T' one robot unit before the tail robot unit Tail and located at a position within T' being the same as a position within a robot unit of the robot v1 with a moving direction of the head robot unit Tail as an at direction and the void operation command is received, a pull command to an adjacent robot in a direction opposite to the at direction;

a return pull command transmitter configured to transfer, in a case where the pull command is received and there is an adjacent robot in the direction opposite to the at direction within the tail robot unit Tail, the pull command to the adjacent robot in the direction opposite to the at direction, and transmit, in a case where the pull command is received and there is no robot adjacent thereto in the direction opposite to the at direction within the tail robot unit Tail, a return pull command to the adjacent robot in the at direction;

a third mover configured to move, in a case where the return pull command is received, the robot in the at direction together with the robot transmitting the return pull command;

a controller configured to perform, in a case where the robot is the robot h, control so as to repeat processing of each of the void generation order determiner, the void generation command transferer, the push command transmitter, the return push command transmitter, the return push command transferer, the void operation command transmitter, the first mover, the void operation command transferer, the movement command transmitter, the return movement command transmitter, the second mover, the pull command transmitter, the return pull command transmitter, and the third mover until all of the robots included in the head robot unit Head are moved to the objective position D;

a set updater configured to update the set Up by adding the objective position D to the set Up in a case where the robot is the robot h and then, in a case where there is a robot unit which is in contact with the set Up and positioned within the target position instead of within the set Up, adding the position of the robot unit and a position of a robot unit in a connected state through only the position of the target position from the robot unit to the set Up; and a second head robot determination command transmitter configured to update, in a case where the robot is the robot h, the position of the tail robot unit Tail and positions of robots located at the objective position D, newly select, in a case where there is a robot unit located at a position belonging to the set Up and adjacent to a position where there is no robot unit within the target position, the robot unit as a head robot unit Head based on the updated positions of the robots, and transmit a head robot determination command including the updated positions of the robots and information on the updated set Up to a new predetermined robot h included in the newly selected head robot unit Head.

2. A control method for a mobile robot that moves from a predetermined initial position to a predetermined target position, the mobile robot including a plurality of robot units, each of the robot units including a plurality of robots, a robot structure of one block including each of the robot units adjacent to another robot unit referred to as connectivity of the robot structure, a common portion between the initial position and the target position set to be a common position, and the common position including a set of one or more partial common positions, and the control method comprising:

transmitting, by a position distance calculation command transmission unit of a robot i_root located at a predetermined root position, a position distance calculation command including a relative position from the predetermined root position and the number of times of transmission and transfer of a position distance calculation command, which are respectively set to predetermined initial values, to an adjacent robot;

incrementing, by a position distance calculation command transferer of the robot receiving the position distance calculation command, the number of times of transmission and transfer included in the position distance calculation command, updating a relative position included in the position distance calculation command in accordance with a direction in which the position distance calculation command is received, and transferring a position distance calculation command including the incremented number of times of transmission and transfer and the updated relative position to an adjacent robot, other than the robot transmitting the position distance calculation command, only once;

transmitting, by a return position distance calculation command transmitter of the robot first receiving the position distance calculation command, a return position distance calculation command including the incremented number of times of transmission and transfer and the updated relative position to the robot transmitting the position distance calculation command;

storing, by a direction storage of the robot first receiving the position distance calculation command, a direction of the robot transmitting the position distance calculation command as a root direction;

transferring, by a return position distance calculation command transferer of the robot receiving the return position distance calculation command, the received return position distance calculation command in the root direction read from the direction storage unit;

selecting, by a first head robot determination command transmitter of the robot i_root receiving the return position distance calculation command, selecting any one partial common position set as a set Up based on the positions of the robots based on the initial position, the target position, and the relative position included in the return position distance calculation command, selecting a robot unit, as a head robot unit Head, which is located at a position belonging to the set Up and adjacent to a position where there is no robot unit within the target position (hereinafter, referred to as an objective position D), and transmitting a head robot determination command including the positions of the robots and information on the set Up to a predetermined robot h included in the selected head robot unit Head;

determining, by a void generation order determiner of the robot h receiving the head robot determination command, the objective position D, a tail robot unit Tail which is a robot unit located at a position not belonging to the set Up and positioned within the initial position and which is a robot unit capable of maintaining connectivity of the robot structure even when moved, a path from the head robot unit Head to the tail robot unit Tail, and a void generation order for the robots within the head robot unit Head, based on the positions of the robots and the information on the set Up;

transmitting, by a void generation command transmitter of the robot h receiving the void generation command, a void generation command addressed to a robot v1 at a position based on the determined void generation order within the head robot unit Head to an adjacent robot unit;

transferring, by a void generation command transferer of the robot receiving the void generation command, the void generation command to an adjacent robot until the void generation command reaches the robot v1;

transmitting, by a push command transmitter of the robot v1 receiving the void generation command, in a case where the robot is the robot v1 and the void generation command is received, a push command to an adjacent robot in an ah direction with a direction in which the head robot unit Head moves as the ah direction;

transferring, by a return push command transmitter of the robot receiving the push command, in a case where there is an adjacent robot in the ah direction, the push command to the adjacent robot in the ah direction, and transmitting, in a case where he push command is received and there is no adjacent robot in the ah direction, a return push command to an adjacent robot in a direction opposite to the ah direction;

transferring, by a return push command transferer of the robot receiving the return push command, the return push command to an adjacent robot in the direction opposite to the ah direction until the return push command reaches the robot v1;

transmitting, by a void operation command transmitter of the robot v1 receiving the return push command, a void operation command to a robot located on the path and adjacent to the robot v1;

transmitting, by a first mover of the robot v1 receiving the return push command, the void operation command and then moving the robot v1 in the ah direction;

transferring, by a void operation command transferer of the robot receiving the void operation command, the void operation command to a robot located on the path and located in a direction approaching the tail robot unit Tail by one box from the robot itself within the path;

transmitting, by a movement command transmitter of the robot receiving the void operation command, a movement command to a robot transmitting the void operation command in a case where the number of times of transmission and transfer of the void operation command is a predetermined number of times;

transmitting, by a return movement command transmitter of the robot receiving the movement command, a return movement command to a robot transmitting the movement command;

moving, by a second mover of the robot receiving the return movement command, the robot in a direction of a robot transmitting the void operation command together with the robot transmitting the void operation command;

transmitting, by a pull command transmitter of the robot included in a robot unit T' one robot unit before the tail robot unit Tail and receiving the void operation command, a pull command to the robot which is included in a robot unit T' one robot unit before the head robot unit Tail and located at a position within T' being the same as a position within a robot unit of the robot v1 with a moving direction of the tail robot unit Tail as an at direction and which is an adjacent robot in a direction opposite to the at direction;

transferring, by a return pull command transmitter of the robot receiving the pull command, in a case where there is an adjacent robot in the direction opposite to the at direction within the tail robot unit Tail, the pull command to the adjacent robot in the direction opposite to the at direction, and transmitting, in a case where the pull command is received and there is no robot adjacent thereto in the direction opposite to the at direction within the tail robot unit Tail, a return pull command to the adjacent robot in the at direction;

moving, by a third mover receiving the return pull command, the robot in the at direction together with the robot transmitting the return pull command;

performing, by a control unit of the robot h, control so as to repeat processing of each of the void generation order determiner, the void generation command transfer, the push command transmitter, the return push command transmitter, the return push command transferer, the void operation command transmitter, the first mover, the void operation command transferer, the movement command transmitter, the return movement command transmitter, the second mover, the pull command transmitter, the return pull command transmitter, and the third mover until all of the robots included in the head robot unit Head are moved to the objective position D;

updating, by a set updater of the robot h, the set Up by adding the objective position D to the set Up and then, in a case where there is a robot unit which is in contact with the set Up and positioned within the target position instead of within the set Up, adding the position of the robot unit and a position of a robot unit in a connected state through only the position of the target position from the robot unit to the set Up; and updating, by a second head robot determination command transmitter of the robot h, the position of the tail robot unit Tail and positions of robots located at the objective position D, newly selecting, in a case where there is a robot unit located at a position belonging to the set Up and adjacent to a position where there is no robot unit within the target position, the robot unit as a head robot unit Head based on the updated positions of the robots, and transmitting a head robot determination command including the updated positions of the robots and information on the updated set Up to a new predetermined robot h included in the newly selected head robot unit Head.

3. A computer-readable non-transitory recording medium storing computer-executable program instructions for a mobile robot that moves from a predetermined initial position to a predetermined target position, the mobile robot including a plurality of robot units, each of the robot units including a plurality of robots, a robot structure of one block including each of the robot units adjacent to another robot unit referred to as connectivity of the robot structure, a common portion between the initial position and the target position set to be a common position, and the common position including a set of one or more partial common positions, that when executed by a processor cause a computer to:

transmit, by a position distance calculation command transmission unit of a robot i_root located at a predetermined root position, a position distance calculation command including a relative position from the predetermined root position and the number of times of transmission and transfer of a position distance calculation command, which are respectively set to predetermined initial values, to an adjacent robot;

increment, by a position distance calculation command transferer of the robot receiving the position distance calculation command, the number of times of transmission and transfer included in the position distance calculation command, updating a relative position included in the position distance calculation command in accordance with a direction in which the position distance calculation command is received, and transferring a position distance calculation command including the incremented number of times of transmission and transfer and the updated relative position to an adjacent robot, other than the robot transmitting the position distance calculation command, only once;

transmit, by a return position distance calculation command transmitter of the robot first receiving the position distance calculation command, a return position distance calculation command including the incremented number of times of transmission and transfer and the updated relative position to the robot transmitting the position distance calculation command;

store, by a direction storage of the robot first receiving the position distance calculation command, a direction of the robot transmitting the position distance calculation command as a root direction;

transfer, by a return position distance calculation command transferer of the robot receiving the return position distance calculation command, the received return position distance calculation command in the root direction read from the direction storage unit;

select, by a first head robot determination command transmitter of the robot i_root receiving the return position distance calculation command, selecting any one partial common position set as a set Up based on the positions of the robots based on the initial position, the target position, and the relative position included in the return position distance calculation command, selecting a robot unit, as a head robot unit Head, which is located at a position belonging to the set Up and adjacent to a position where there is no robot unit within the target position (hereinafter, referred to as an objective position D), and transmitting a head robot determination command including the positions of the robots and information on the set Up to a predetermined robot h included in the selected head robot unit Head;

determine, by a void generation order determiner of the robot h receiving the head robot determination command, the objective position D, a tail robot unit Tail which is a robot unit located at a position not belonging to the set Up and positioned within the initial position and which is a robot unit capable of maintaining connectivity of the robot structure even when moved, a path from the head robot unit Head to the tail robot unit Tail, and a void generation order for the robots within the head robot unit Head, based on the positions of the robots and the information on the set Up;

transmit, by a void generation command transmitter of the robot h receiving the void generation command, a void generation command addressed to a robot v1 at a position based on the determined void generation order within the head robot unit Head to an adjacent robot unit;

transfer, by a void generation command transferer of the robot receiving the void generation command, the void generation command to an adjacent robot until the void generation command reaches the robot v1;

transmit, by a push command transmitter of the robot v1 receiving the void generation command, in a case where the robot is the robot v1 and the void generation command is received, a push command to an adjacent robot in an ah direction with a direction in which the head robot unit Head moves as the ah direction;

transfer, by a return push command transmitter of the robot receiving the push command, in a case where there is an adjacent robot in the ah direction, the push command to the adjacent robot in the ah direction, and transmitting, in a case where he push command is received and there is no adjacent robot in the ah direction, a return push command to an adjacent robot in a direction opposite to the ah direction;

transfer, by a return push command transferer of the robot receiving the return push command, the return push command to an adjacent robot in the direction opposite to the ah direction until the return push command reaches the robot v1;

transmit, by a void operation command transmitter of the robot v1 receiving the return push command, a void operation command to a robot located on the path and adjacent to the robot v1;

transmit, by a first mover of the robot v1 receiving the return push command, the void operation command and then moving the robot v1 in the ah direction;

transfer, by a void operation command transferer of the robot receiving the void operation command, the void operation command to a robot located on the path and located in a direction approaching the tail robot unit Tail by one box from the robot itself within the path;

transmit, by a movement command transmitter of the robot receiving the void operation command, a movement command to a robot transmitting the void operation command in a case where the number of times of transmission and transfer of the void operation command is a predetermined number of times;

transmit, by a return movement command transmitter of the robot receiving the movement command, a return movement command to a robot transmitting the movement command;

move, by a second mover of the robot receiving the return movement command, moving the robot in a direction of a robot transmitting the void operation command together with the robot transmitting the void operation command;

transmit, by a pull command transmitter of the robot included in a robot unit T' one robot unit before the tail robot unit Tail and receiving the void operation command, a pull command to the robot which is included in a robot unit T' one robot unit before the head robot unit Tail and located at a position within T' being the same as a position within a robot unit of the robot v1 with a moving direction of the tail robot unit Tail as an at direction and which is an adjacent robot in a direction opposite to the at direction;

transfer, by a return pull command transmitter of the robot receiving the pull command, in a case where there is an adjacent robot in the direction opposite to the at direction within the tail robot unit Tail, the pull command to the adjacent robot in the direction opposite to the at direction, and transmitting, in a case where the pull command is received and there is no robot adjacent thereto in the direction opposite to the at direction within the tail robot unit Tail, a return pull command to the adjacent robot in the at direction;

move, by a third mover receiving the return pull command, the robot in the at direction together with the robot transmitting the return pull command;

perform, by a control unit of the robot h, control so as to repeat processing of each of the void generation order determiner, the void generation command transfer, the push command transmitter, the return push command transmitter, the return push command transferer, the void operation command transmitter, the first mover, the void operation command transferer, the movement command transmitter, the return movement command transmitter, the second mover, the pull command transmitter, the return pull command transmitter, and the third mover until all of the robots included in the head robot unit Head are moved to the objective position D;

update, by a set updater of the robot h, the set Up by adding the objective position D to the set Up and then, in a case where there is a robot unit which is in contact with the set Up and positioned within the target position instead of within the set Up, adding the position of the robot unit and a position of a robot unit in a connected state through only the position of the target position from the robot unit to the set Up; and update, by a second head robot determination command transmitter of the robot h, the position of the tail robot unit Tail and positions of robots located at the objective position D, newly selecting, in a case where there is a robot unit located at a position belonging to the set Up and adjacent to a position where there is no robot unit within the target position, the robot unit as a head robot unit Head based on the updated positions of the robots, and transmitting a head robot determination command including the updated positions of the robots and information on the updated set Up to a new predetermined robot h included in the newly selected head robot unit Head.

* * * * *